W. E. GIFFORD.
NUT LOCK.
APPLICATION FILED DEC. 29, 1908.
916,298.
Patented Mar. 23, 1909.
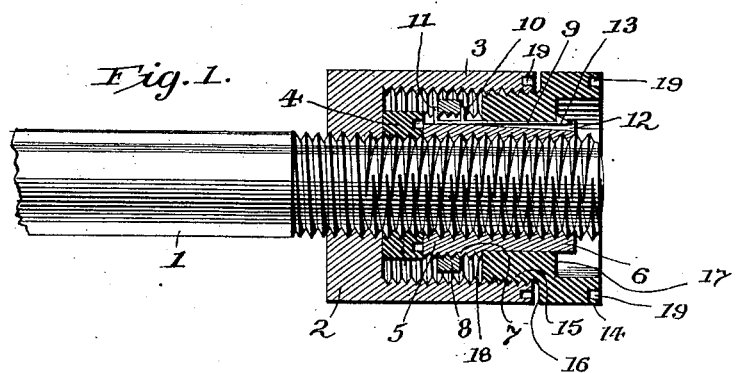
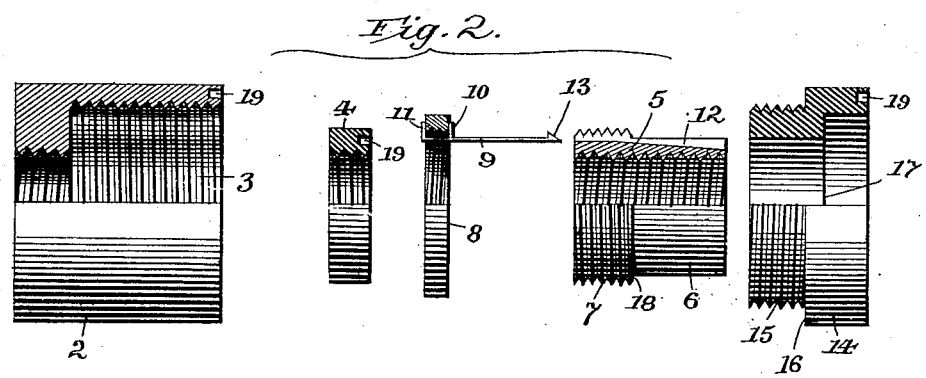

UNITED STATES PATENT OFFICE.

WILLIS E. GIFFORD, OF FAIRFIELD, MAINE, ASSIGNOR OF ONE-FOURTH TO LEON V. MARR AND ONE-FOURTH TO MARK P. EMERY, BOTH OF FAIRFIELD, MAINE.

NUT-LOCK.

No. 916,298.     Specification of Letters Patent.     Patented March 23, 1909.

Application filed December 29, 1908. Serial No. 469,862.

*To all whom it may concern:*

Be it known that I, WILLIS E. GIFFORD, a citizen of the United States, residing at Fairfield, in the county of Somerset and State of Maine, have invented certain new and useful Improvements in Nut-Locks, of which the following is a specification.

My present invention pertains to improvements in nut-locks, the construction and advantages of which will be hereinafter set forth, reference being had to the accompanying drawings, wherein:

Figure 1 is a longitudinal sectional view of the lock; and Fig. 2 a sectional elevation of the nuts, shown in their separated position.

The object of the present invention is to produce a nut-lock which will be locked in both directions with reference to the bolt, axle-skein or the like upon which it is mounted, and at the same time be perfectly adjustable, so that the parts may be brought to proper position with relation to the member which is to be held thereby.

In the use of vehicles, more particularly motor vehicles, it is essential that the nut or member which contacts with the rotary member, as for instance, the hub of a wheel, should be held against motion in either direction, and where cup-races or similar forms of bearings are employed it is essential that the adjustment of the parts should be so fine as to take up any lost motion and yet at the same time not cramp the parts.

The lock shown in the present case is susceptible of being brought to any desired adjustment with reference to the member against which it bears and then locked in place against movement in either direction.

Referring to the drawings, 1 denotes an axle-skein or similar member which is provided with right and left-handed threads at one end.

2 designates a cap nut, provided with right-handed threads to engage said threaded portion of the member 1. The sleeved portion 3 of said nut is provided on its inner face with internal threads, which are left-handed. Said cap-nut is designed to be threaded upon the axle-skein and brought to the desired adjusted position. A nut 4 of an outer diameter less than the opening in the sleeve 3 and provided with left-handed threads, is then screwed up against the inner face of the nut 2. A third nut 5, provided with a series of right-handed threads formed upon its inner face, is next threaded upon the skein and brought home against the outer face of the nut 4. As will be seen upon reference to Fig. 2, the nut 5 is provided with an external threadless section 6, and, at its inner end, with a series of threads 7, upon which is passed a ring or nut 8, carrying a spring-arm 9, said arm having fingers 10 and 11 which engage the side faces of the nut 8. A slot or way 12 is formed in the outer face of the nut 5 for the reception of said spring-arm 9, and a hook 13, formed upon the outer end of said arm. The slot or way 12 is of sufficient depth to permit the hook to lie flush with the outer face of the sleeved section 6 of the nut 5, so that an outer clamping nut or ring 14 may be passed over said sleeve. The nut 14 is provided with an externally-threaded section 15, the threads being left-handed threads and adapted to engage the left-handed threads in the sleeved portion 3.

By adjusting the nut 8 upon the threads 7 the hook 13 may be brought to the proper position to pass upward, out of the slot or way 12, and engage a shoulder 17 formed upon the nut 14 when said nut is screwed home. The nut 14 cannot then be backed off of or away from the cap-nut 2 unless the spring hook 13 is pushed inwardly by a suitable tool, while at the same time the nut 14 is backed.

The parts are so proportioned that the inner end of the threaded section 15 will contact with a shoulder 18 formed upon the nut 5 at the point of meeting of the threaded section 7 and the section 6, when the nut 14 is fully turned up.

The threaded section 15 will be of such length that the shoulder 16 of the nut 14 will not contact with the end of the sleeve 3 when the parts are finally clamped. In other words, a clearance is left in order to allow for wear of the parts.

It will thus be seen that the nut 2 cannot be turned in either direction, and if it be employed in conjunction with a wheel or a member having rotary motion about the member 1, cannot be moved in either direction through the friction of the rotary member. It cannot be turned backward by reason of the fact that the nut 4 abuts squarely against the same and it cannot be turned in the oposite direction by reason of the fact that the nut 14 is coupled thereto by a left-hand thread formed upon the sleeved portion 3, and said nut 14 is held positively against inward movement by reason of abutting against the shoulder 18 upon the nut 5.

Where the device is to be used in a hub or the like, each of the nuts will preferably be provided with recesses 19 for the reception of a proper wrench or other tool by which the nuts may be turned, as is usual in constructions of this character.

Having thus described my invention, what I claim is:

1. In combination with a supporting member provided with right and left-handed threads, a nut adapted to bear against the member to be clamped or held in position, said nut having a threaded engagement with said supporting member; a nut also mounted upon the supporting member, said nut being reversely threaded and bearing against the first-named nut; a third nut threaded in a manner similar to the first nut, said nut bearing against the second nut; and a fourth nut having a threaded engagement with the first nut, said threads having a direction the reverse of those between the first nut and the supporting member, said fourth nut abutting against the third-mentioned nut and holding the same against movement.

2. In combination with a supporting member provided with intersecting right and left-hand threads; a nut adapted to bear against the member to be held, said nut having a threaded engagement with the supporting member; a second nut mounted upon the supporting member, said nut being threaded the reverse of the first nut and bearing directly against the same; a third nut mounted upon the supporting member, and being threaded in the same direction as the first nut and serving to lock the second nut in place; a fourth nut having a threaded engagement with the first nut and bearing against the third nut; and means for preventing retrograde movement of said last-mentioned nut.

3. In combination with a supporting member provided with intersecting right and left-hand threads; a nut adapted to bear against the member to be held, said nut having a threaded engagement with the supporting member; a second nut mounted upon the supporting member, said nut being threaded the reverse of the first nut and bearing directly against the same; a third nut mounted upon the supporting member and being threaded in the same direction as the first nut and serving to lock the second nut in place; a fourth nut having a threaded engagement with the first nut and bearing against the third nut; and adjustable means for preventing retrograde movement of said last-mentioned nut.

4. In combination with a supporting member provided with intersecting right and left-hand threads; a nut adapted to bear against the member to be held, said nut having a threaded engagement with the supporting member; a second reversely-threaded nut mounted upon the supporting member, and bearing against the first nut; a third nut threaded similarly to the first nut and bearing against the second nut; a spring catch adjustably mounted upon the third nut and standing in line with a recess formed in the outer face of said third nut; and a fourth nut having a threaded engagement with the first nut, said fourth nut likewise bearing against the third nut and being engaged by the catch.

5. In combination with a supporting member provided with intersecting right and left-hand threads; a nut having right-hand threads engaging said member, said nut being formed with a sleeve having left-hand threads thereon; a second nut having left-hand threads, said nut being mounted upon the supporting member within the sleeved portion of the first nut and bearing against the body thereof; a third nut, said nut being formed internally with right-hand threads and likewise upon its outer face with a threaded section; a nut mounted upon said section; a spring catch in engagement with said last-mentioned nut and standing in line with a slot formed in the outer face of the third nut; and a lock-nut having a threaded section adapted to engage the left-hand threads of the sleeve section of the first nut and to abut against a shoulder formed by the external threaded section of the third nut, said lock nut when brought home being engaged by the catch.

6. In a nut-lock, the combination of a supporting member having right and left-hand threads; a nut mounted thereon; a locking nut connected to said first nut by a thread the reverse of that by which said first nut is connected to the supporting member; and a pair of nuts interposed between said first nut and the locking nut, said nuts being reversely threaded.

7. In a nut-lock, the combination of a supporting member having right and left-hand threads; a nut mounted thereon; a locking nut connected to the first nut by a thread the reverse of that by which said first nut is connected to the supporting member; a pair of nuts interposed between the first nut and the locking nut, the nuts of said pair being reversely threaded; and a catch extending outwardly from one of said inner nuts into locking engagement with the locking nut when said latter nut is brought to its final adjusted position.

In testimony whereof I have signed my name to this specification in the presence of two subscribing witnesses.

WILLIS E. GIFFORD.

Witnesses:
HORACE A. DODGE,
PERCY H. RUSSELL.